(12) United States Patent
Horoszczak

(10) Patent No.: US 12,038,236 B2
(45) Date of Patent: Jul. 16, 2024

(54) FRACTAL HEAT EXCHANGER

(71) Applicant: Hamilton Sundstrand Corporation, Charlotte, NC (US)

(72) Inventor: Adam Horoszczak, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 33 days.

(21) Appl. No.: 17/147,830

(22) Filed: Jan. 13, 2021

(65) Prior Publication Data
US 2021/0231383 A1    Jul. 29, 2021

(30) Foreign Application Priority Data

Jan. 24, 2020    (EP) .................................... 20153729

(51) Int. Cl.
| | |
|---|---|
| *F28D 7/16* | (2006.01) |
| *F28D 9/00* | (2006.01) |
| *F28F 3/08* | (2006.01) |
| *F28F 7/02* | (2006.01) |
| *F28F 9/02* | (2006.01) |

(52) U.S. Cl.
CPC ............. *F28D 7/16* (2013.01); *F28D 9/0062* (2013.01); *F28F 3/08* (2013.01); *F28F 7/02* (2013.01); *F28F 9/0275* (2013.01)

(58) Field of Classification Search
CPC .. F28F 9/0275; F28F 3/12; F28F 9/027; F28F 2210/02; F28D 1/0308; F28D 1/0358; B33Y 10/00
See application file for complete search history.

(56) References Cited

U.S. PATENT DOCUMENTS 2,471,960 A * 5/1949 Johnson .................. F25B 39/04
165/169
3,265,128 A * 8/1966 Legrand .................... F28F 9/22
165/DIG. 422

(Continued)

FOREIGN PATENT DOCUMENTS

CN          109579575 A    4/2019
DE       202019102083 U1    4/2019

(Continued)

OTHER PUBLICATIONS

European Search Report for Application No. 20153729.7, mailed Jul. 27, 2020, 7 pages.

(Continued)

*Primary Examiner* — Tho V Duong
*Assistant Examiner* — For K Ling
(74) *Attorney, Agent, or Firm* — CANTOR COLBURN LLP

(57) ABSTRACT

A fractal heat exchanger comprises: a heat exchanger core comprising a plurality of channels in a close-packed configuration, the plurality of channels comprising a plurality of first channels and a plurality of second channels; a first fractal channel for conveying a first fluid to the plurality of first channels of the heat exchanger core; and a second fractal channel for conveying the first fluid from the plurality of first channels of the heat exchanger core; wherein the first fractal channel and the second fractal channel each comprise at least one divergence point along its length where a parent channel splits into a plurality of sub-channels which diverge away from each other.

9 Claims, 3 Drawing Sheets

(56) References Cited

U.S. PATENT DOCUMENTS

| | | | | |
|---|---|---|---|---|
| 3,563,303 | A * | 2/1971 | Gilli | F28F 9/0275 |
| | | | | 165/174 |
| 7,665,956 | B2 * | 2/2010 | Mitchell | F01D 5/182 |
| | | | | 415/115 |
| 9,062,918 | B2 * | 6/2015 | He | F22B 21/28 |
| 10,001,325 | B2 * | 6/2018 | Bergh | F28F 3/025 |
| 10,107,555 | B1 | 10/2018 | Miller | |
| 10,267,515 | B2 | 4/2019 | Adriany et al. | |
| 2013/0206374 | A1 * | 8/2013 | Roisin | B22F 7/002 |
| | | | | 165/165 |
| 2017/0001943 | A1 | 1/2017 | Gautam et al. | |
| 2017/0030651 | A1 * | 2/2017 | Rock, Jr. | F28F 1/06 |
| 2017/0089643 | A1 * | 3/2017 | Arafat | F28F 7/02 |
| 2017/0205156 | A1 * | 7/2017 | Ranjan | F28F 1/02 |
| 2017/0248372 | A1 | 8/2017 | Erno et al. | |
| 2018/0266770 | A1 * | 9/2018 | Wagner | F28D 7/0025 |
| 2019/0086154 | A1 | 3/2019 | Adriany et al. | |

FOREIGN PATENT DOCUMENTS

| | | |
|---|---|---|
| EP | 3173724 A1 | 11/2016 |
| EP | 3705828 A1 | 9/2020 |
| EP | 3842723 A1 | 6/2021 |
| WO | 2011115883 A2 | 9/2011 |
| WO | 2020109707 A1 | 6/2020 |

OTHER PUBLICATIONS

EPO Official Letter for Application No. 20153729.7, mailed Apr. 4, 2022, 5 pages.

* cited by examiner

FRACTAL HEAT EXCHANGER

FOREIGN PRIORITY

This application claims priority to European Patent Application No. 20153729.7 filed Jan. 24, 2020, the entire contents of which is incorporated herein by reference.

TECHNICAL FIELD

The invention relates to a heat exchanger and to a method of manufacturing a heat exchanger.

BACKGROUND

Heat exchangers for transfer of heat between different fluids are very widely used and exist in various forms. Typically heat exchangers are arranged for flow of a primary fluid and a secondary fluid with heat being transferred between the two fluids as they flow through the device. Multi-stream heat exchangers for exchanging heat between more than two fluids also exist in the prior art. Heat exchangers are required within aircraft structures to regulate temperatures of working fluids as well as to scavenge heat from one system for use in another. Every heat exchanger consumes significant space within an aircraft structure, and in certain areas of the aircraft structure space is at a premium and it is therefore desirable to optimise the size of each component fit them together in a way that minimises the space taken, while also maintaining sufficient levels of heat transfer.

Some heat exchangers have a layered structure with a large number of parallel flow paths between plates that separate the flow paths. There may be 50-200 plates, or more, in this type of heat exchanger, typically with alternating hot/cold fluid flow paths either side of each plate. Such heat exchangers can also be referred to as laminate heat exchangers.

In laminate heat exchangers, the flow paths will typically be square or rectangular in cross-section meaning that there is very limited primary heat transfer surface area. In circumstances where the entire space between two adjacent plated forms the flow path, the primary heat transfer surface is only the top and bottom surface. There is therefore a desire to provide heat exchanger cores with increased primary transfer surfaces.

In certain heat exchangers, instead of having a core comprising multiple plates defining flow paths alternating between hot and cold fluid, it is possible to provide a heat exchanger core comprising multiple flow path tubes in contact with each other arranged in a plurality of rows and columns. The fluid flow path tubes in each row alternate between hot fluid and cold fluid thus providing a larger primary heat transfer surface.

Heat exchanger cores typically require large headers to supply the hot fluid to the heat exchanger core. These significantly increase the weight and size of the overall heat exchanger which can lead to a reduction in working efficiency.

There is therefore a need to provide an inlet and outlet arrangement that can supply the fluid in an alternating fashion to so many flow path tubes within the heat exchanger core.

Recent developments in additive manufacturing allow for more complex geometries of heat exchangers to supply fluid to multiple flow path tubes. One area of this emerging technology utilises fractal-type connecting structures whereby heat exchanger channels divide into two or more sub-channels at divergence points along the length of the channel.

These small sub-channels which feed flow path tubes in the heat exchanger core can be subject to vibration damage. In typical heat exchangers, these small sub-channels will also be positioned in the coldest part of the flow which can lead to high thermal gradients resulting in high thermal stress peaks.

There is therefore a need to provide a heat exchanger which can overcome the above problems, such as preventing any vibration damage, heat transfer stresses and increasing the working efficiency of the heat exchanger.

SUMMARY OF INVENTION

Viewed from a first aspect, there is provided a heat exchanger comprising: a heat exchanger core comprising a plurality of channels in a close-packed configuration, the plurality of channels comprising a plurality of first channels and a plurality of second channels; a first fractal channel for conveying a fluid to the plurality of first channels of the heat exchanger core; and a second fractal channel for conveying the fluid from the plurality of first channels of the heat exchanger core; wherein the first fractal channel and the second fractal channel each comprises at least one divergence point along its length where a parent channel splits into a plurality of sub-channels which diverge away from each other.

This combines the use of a fractal channel with a heat exchanger core comprising a plurality of channels fed by each sub-channel of the fractal channel. The use of a fractal channel allows fluids to be distributed between a large number of close-packed first and second fluid channels, giving a large heat transfer surface to maximise heat transfer efficiency within a compact volume.

The heat exchanger may further comprise an outer wall extending from the heat exchanger core and defining a second fluid inlet and a second fluid outlet for a second fluid to flow through the second fluid channels, wherein the second fluid inlet and the second fluid outlet are axially aligned with each other along a longitudinal axis of the heat exchanger.

This allows the outer wall to replace part of a duct carrying a second fluid, for example. By positioning the heat exchange core within a duct the heat exchanger can fit within a relatively confined space. In particular this heat exchanger can be placed in the area where a duct is normally present. This eliminates the need for additional space to mount a conventional plate-fin heat exchanger with ducts connected to the second fluid inlet and outlet.

By positioning the first fractal channel and the second fractal channel within said duct, the fractal channels also take part in the heat transfer as the second fluid surrounds the fractal channels. This means that heat transfer will take place along the entire length of the fluid flow path, from the first fractal channel, through the heat exchanger core and to the second fractal channel. Thus, the heat transfer efficiency will be increased compared to conventional heat exchanger cores.

The heat exchanger may further comprise a first fluid inlet conduit connected to the first fractal channel and a first fluid outlet conduit connected to the second fractal channel. The first fluid inlet and outlet conduits may both extend through the outer wall.

The first fluid inlet conduit and the first fluid outlet conduit may be at an angle of between 45 and 90 degrees with respect to the longitudinal axis of the body of the heat exchanger.

The fluid conveyed by the first fractal channel and the second fractal channel may be a first fluid. The first fluid may be the "hot flow" and the second fluid may be the "cold flow". Alternatively, the first fluid may be the "cold flow" and the second fluid may be the "hot flow".

The heat exchanger core may comprise a homogeneous block of material having a plurality of bores extending therethrough defining the plurality of channels. Each sub-channel of the first fractal channel and second fractal channel may be directly connected to every alternating channel of the heat exchanger core. Each alternating channel may therefore be supplied with secondary fluid. The other channels of the heat exchange core may be supplied with the primary fluid from the duct. This arrangement means that the block is less prone to vibration damage than if unsupported tubes were used for the channels.

The first fractal channel and second fractal channel may comprise multiple fractal stages wherein each fractal stage may comprise a parent channel and its subsequent sub-channels.

The sub-channels may be rotationally symmetrical about the corresponding parent channel. For example, in the case where there are four sub-channels, each sub-channel may be offset by 90 degrees from neighbouring sub-channels.

The sub-channels may have smaller diameters than a diameter of a corresponding parent channel. The sub-channels may diverge away from a central axis of the parent channel.

The sub-channels of each fractal stage may be shaped such that at least a portion of each sub-channel is parallel to a common axis The sub-channels of each fractal stage may be shaped so that a portion of the sub-channels are diverging away from the common axis. Each sub-channel may form a parent channel of a subsequent fractal stage.

The sub-channels of each fractal stage may be distributed in a grid configuration.

A cross-sectional area of each parent channel may be equal to a total cross-sectional area of its corresponding sub-channels. This results in the overall cross-sectional area of the first fractal channel and the second fractal channel being constant along their respective length. This helps to prevent any significant pressure drops in the flow of the fluid.

Each channel of the heat exchanger core may have any shape cross section. For example, the channels may be rectangular, square, circular, round or diamond shape.

The heat exchanger device may be for use with any required combination of fluids, such as liquid-liquid, liquid-gas or gas-gas heat exchange. The heat exchanger may be configured to use air as the second fluid for heating or cooling of the first fluid.

In some examples the heat exchanger is for aerospace use and an embodiment of the invention may provide an aircraft including the heat exchanger device described above. In context of aerospace use the first and second fluids could include any combination of two of: atmospheric air, cabin air, engine oil, generator oil, coolant, fuel and so on. Any combination of these fluids can be used within the same heat exchange device, it is not limited to two types of fluid. The fluid used depends on the requirements of the heat exchanger as different fluid will have different thermal and fluidic properties. Some fluid will move with a lower/higher velocity than others which may be preferable in certain situations to provide the necessary thermal transfer.

Viewed from a second aspect, there is provided a method for manufacturing a heat exchanger comprising: forming a heat exchanger core comprising a plurality of channels in a close-packed configuration, wherein the plurality of channels comprise a plurality of first channels and a plurality of second channels; forming a first fractal channel for conveying a fluid to the plurality of first channels of the heat exchanger core; and forming a second fractal channel for conveying the fluid from the plurality of first channels of the heat exchanger core; wherein the first fractal channel and the second fractal channel each comprise one or more divergence points along their length where a parent channel splits into two or more sub-channels which diverge away from each other.

The method may include providing the heat exchanger with any of the features discussed above in connection with the first aspect.

The heat exchanger may be manufactured by a process of additive manufacturing as one piece.

The heat exchanger may be printed starting from a first end of the duct in a longitudinal direction to a second end of the duct.

This allows for rapid production and for producing the complex shapes or the irregular geometries required. Additive manufacturing allows for the complex configuration described by the first aspect of the invention to be manufactured quickly in one printed part.

BRIEF DESCRIPTION OF FIGURES

Example embodiments of the invention are described below by way of example only and with reference to the accompanying drawings.

DETAILED DESCRIPTION OF FIGURES

Figure 1:
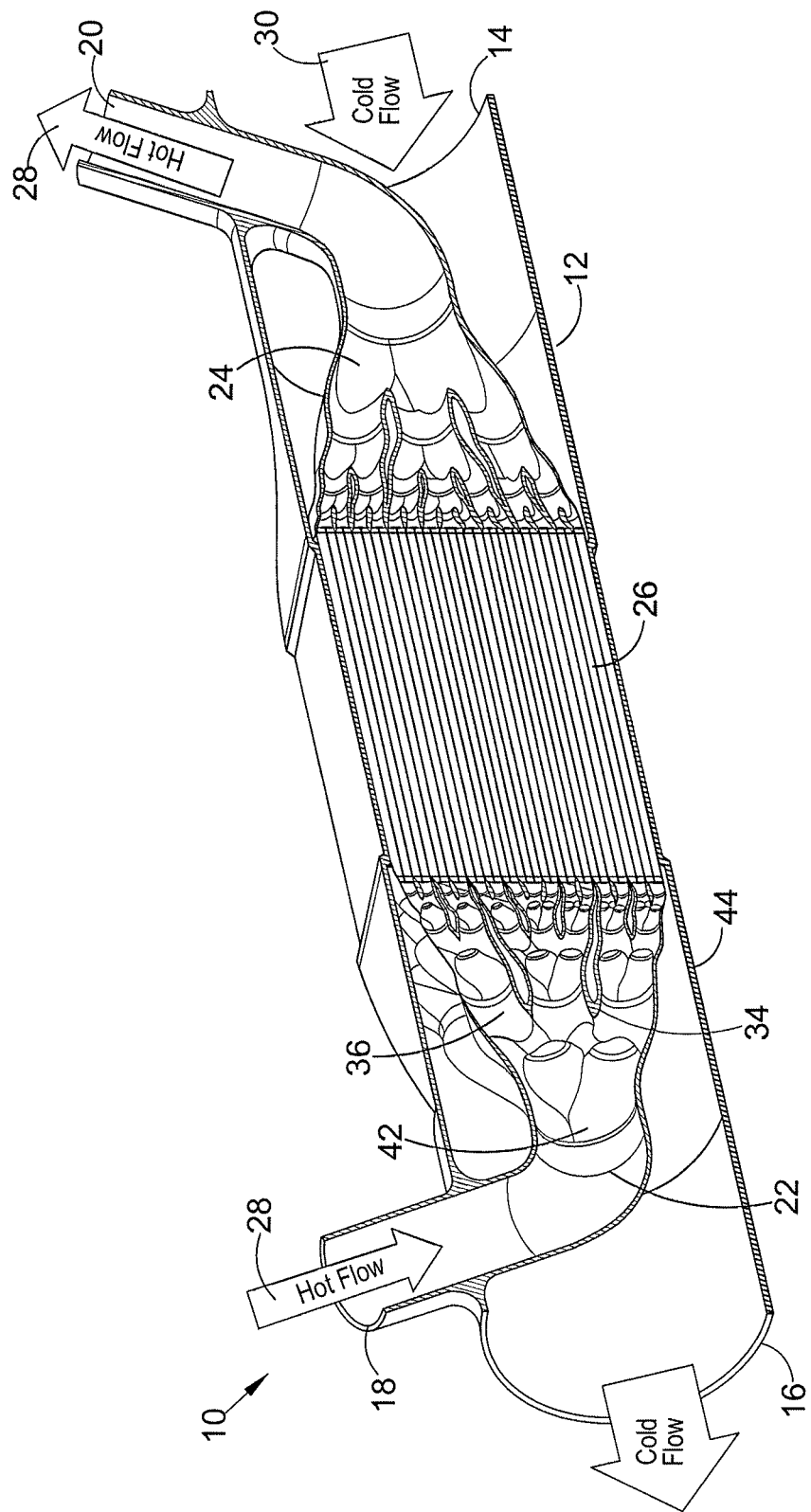
FIG. 1 shows a heat exchanger.

FIG. 1 shows a heat exchanger 10. The heat exchanger 10 is arranged to exchange thermal energy between a first fluid 28 and a second fluid 30, whilst preventing the first fluid 28 and second fluid 30 from mixing with one another.

The heat exchanger 10 comprises a body 12 defining a first fluid inlet 14 and a first fluid outlet 16. The body 12 conveys a second fluid 30 from a second fluid inlet 14 through a heat exchanger core 26 to a second fluid outlet 16. A first and second portion of the body 12 comprises an outer wall 44 which resembles a duct.

In the illustrated embodiment, the second fluid inlet 14 and second fluid outlet 16 are axially aligned with one another and are substantially equal in flow area. The body 12 is configured so as to replace a section of a fluid duct, or the like, carrying the second fluid 30.

The heat exchanger 10 further comprises a first fluid inlet conduit 18 and a first fluid outlet conduit 20. The first fluid inlet conduit 18 and the first fluid outlet conduit 20 enter through a side wall of the body 12 of the heat exchanger 10 and pass through the flow of the second fluid 30.

The first fluid inlet conduit 18 leads into a first fractal channel 22 which is directly connected to a first end of the heat exchanger core 26 positioned within the body 12 of the heat exchanger 10. A second end of the heat exchanger core 26 is directly connected to a second fractal channel 24 which leads to the first fluid outlet conduit 20. In the illustrated embodiment, the first fluid 28 and the second fluid 30 are supplied to the heat exchanger core 26 in a counter-current fashion. However, the fluid flow directions may alternatively be supplied to the heat-exchanger core in a co-current fashion.

The term fractal channel here describes the repeated diverging structure of the channels, whereby the channel repeatedly splits into two or more smaller sub-channels 36 along its length. Such structures are sometimes also known as multi-furcating channels.

Figure 2:
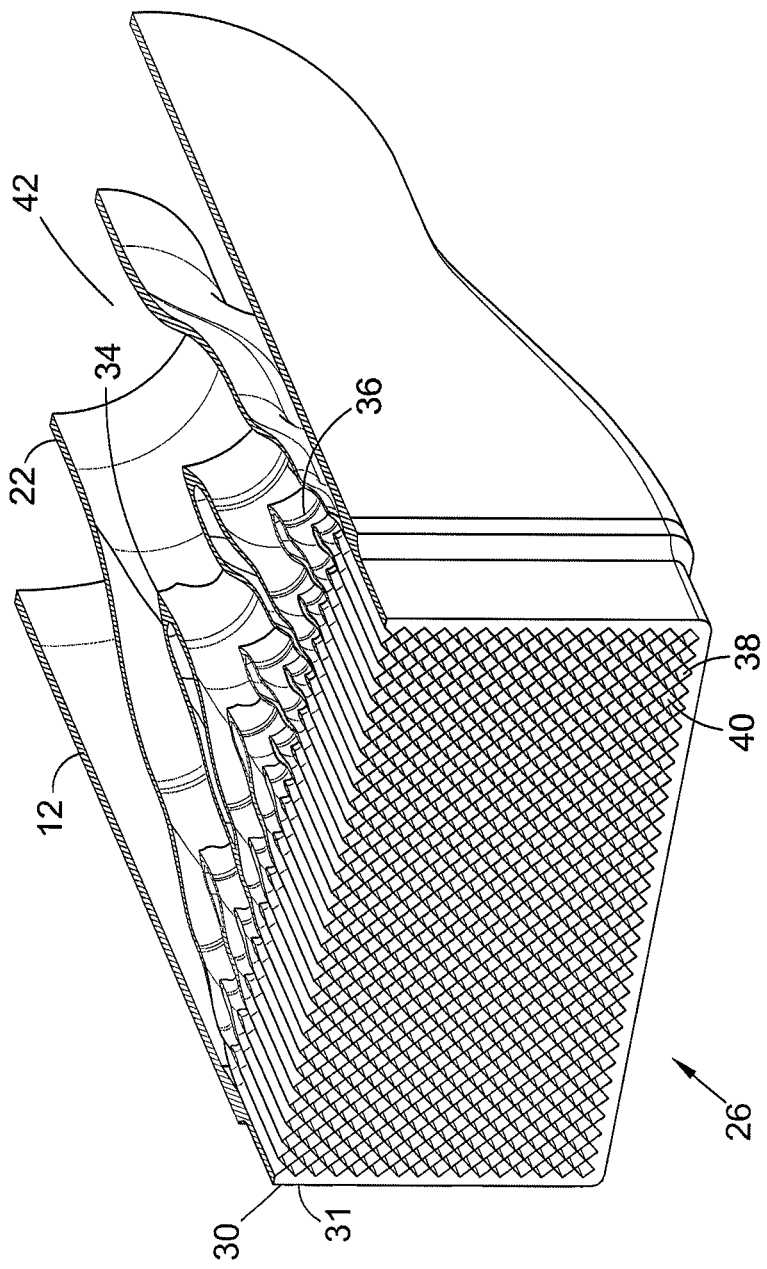
FIG. 2 shows a detailed cut-away view of a heat exchanger core of the heat exchanger.

FIG. 2 shows a cut-away view of the first fractal channel 22. The second fractal channel 24 in FIG. 2 can have the same structure as the first fractal channel 22, but is oriented in reverse.

The fractal channel 22 comprises a plurality of fractal stages.

The first fractal stage comprises a parent channel 42 with the largest diameter, corresponding to the diameter of the first fluid inlet conduit 18. The parent channel 42 of the first fractal stage reaches a first divergence point 34 where the parent channel 42 splits into nine sub-channels 36, the middle three of which are visible in the cut-away of FIG. 2, each having a smaller diameter than the parent channel 42. The outer sub-channels 36 initially diverge away from each other and a central axis of the parent channel 42, whilst the central sub-channel 36 continues along the central axis. The outer sub-channels 36 are curved such that after a given length the direction of the sub-channels become parallel to the central axis of the parent channel 42.

The nine sub-channels 36 are arranged in a 3×3 grid and are 90 degrees rotationally symmetrical.

Each sub-channel 36 then forms the parent channel in the next fractal stage. The second fractal stage of the fractal channel 22 comprises nine parent channels, corresponding to the nine sub-channels 36 of the first fractal stage. Each parent channel of the second fractal stage reaches a second divergence point 34 and splits into a plurality of additional sub-channels which diverge and curve in the same way as for the first fractal stage. These nine parent channels divide into 49 sub-channels arranged in a 7×7 grid.

The sub-channels 36 of the second fractal stage form the parent channels of a third fractal stage, in which those parent channels diverge at a third divergence point to form 225 sub-channels arranged in a 15×15 grid.

The sub-channels of the third fractal stage subsequently form the fourth fractal stage which split in the same manner at a fourth divergence point to form 961 channels in a 31×31 grid.

Each sub-channel 36 is radially offset from the central axis of the corresponding patent channel 42.

The individual sub-channels 36 of each fractal stage have a smaller diameter than the individual sub-channels of the preceding fractal stage. The total cross-sectional flow area of the sub-channels 36 within each particular fractal stage is substantially equal, therefore the total cross-sectional flow area through the fractal channel 22 remains substantially constant. This prevents any pressure drop from occurring in the first fluid 28.

In FIG. 1, the first fractal 22 is as described with respect to FIG. 2. The sub-channels 36 of the fourth fractal stage in the first fractal 22 are directly connected to alternative channels of the heat exchanger core 26. The sub-channels 36 of the fourth fractal stage in the second fractal channel 24 are directly, fluidly, connected to a second end of the heat exchanger core 26.

FIG. 2 also shows a detailed cut-away of the heat exchanger core 26. The heat exchanger core 26 is of a single, solid, construction defining a plurality of parallel channels within it. The plurality of parallel channels comprise a plurality of first fluid channels 38 and a plurality of second fluid channels 40. As the heat exchanger core 26 is a single, solid, construction it will be more resistant to vibration damage than a heat exchanger comprising unsupported or intermittently supported parallel tubes.

The second fluid channels 40 in the heat exchanger core 26 are supplied with second fluid 28 at a first end of the heat exchanger core 26 from the second fluid inlet 14 of the body 12. The first fluid channels 38 are supplied with first fluid 28 at a second end of the heat exchanger core 26 by the first fractal channel 22.

The second fluid 30 exits the heat exchanger core 26 at the second end and travels around the first fractal channel 22 to the second fluid outlet 16. The first fluid 28 exits the heat exchanger core 26 at the first end the second fractal channel 24. Accordingly, the first fluid 28 is conveyed by the first channels 38 and the second fluid 30 is conveyed by the second channels 40. It will be appreciated that alternatively, the first fluid 30 can be conveyed by the second channels 40 and the second channels The heat exchanger core 26 comprises an approximately equal number of first fluid channels 38 and second fluid channels 40. In the illustrated example, the first fluid channels 38 are arranged in a 31×31 grid (i.e. with 961 first fluid channels 38), whilst the second fluid channels are arranged in a 30×30 grid (i.e. with 900 second fluid channels 40).

In the illustrated embodiment, the first and second channels 38, 40 within the heat exchanger core 26 each have a square diamond cross-sectional shape and are arranged in a grid configuration.

The first and second channels 38, 40 are arranged in an alternating fashion such that every side of each first channel 38 will act as a primary heat transfer surface with an adjacent second channel 40, and vice versa. It will be appreciated that any cross-section shape can be used, for example the cross section of the channels may be rectangular, circular, diamond or any other shape. It is also possible for some of the channels to have different cross section shapes than other channels, this will however require different wall thicknesses to accommodate for it.

The total of the cross-sectional flow area of all the second fluid channels 40 is equal to the total cross-sectional flow area of both the first and second fractal channels 22, 24. This prevents pressure fluctuations in the first fluid 28.

The total cross-sectional flow area of the first fluid channels 38 is approximately equal to the total cross-sectional flow area of the second fluid channels 40. In the illustrated embodiment, this is less than the cross-sectional flow area of the second fluid inlet 14 and second fluid outlet 16. However, if it is necessary to avoid pressure variations in the second fluid 30 as well as the first fluid 28, then the body 12 may be designed such that the total cross-sectional flow area of the second fluid channels 38 is approximately equal to the cross-sectional flow area of the second fluid inlet 14 and the second fluid outlet 16.

The heat exchanger core 26 is arranged so that all of the first fluid 28 and all of the second fluid 30 passes respectively through the first and second channels 38, 40 of the heat exchanger core 26.

The overall cross-section of the heat exchanger core 26 is rectangular, however it could be circular or any other cross section. Referring to FIG. 1, the first fluid inlet conduit 18 and the first fluid outlet conduit 20 extend through a side wall of the body 12 at an angle to the longitudinal direction of the duct 12. The angle between the ends of first fluid inlet conduit 18 and the first fluid outlet conduit 20 is approximately 45 degrees, however it will be appreciated that the angle can be up to 90 degrees. The first parent channel 42 of the fractal channel is curved so that the end of the first parent channel 42 is parallel to the longitudinal direction of the duct 12.

In use, the heat exchanger 10 uses counter flow so the first fluid 28 and the second fluid 30 travel in opposite directions. The second fluid 30 enters the heat exchanger 10 at the second fluid inlet 14. The second fluid 30 then enters the heat exchanger core 26 at a first end and travels through the first second channels 40 of the heat exchanger core 26 and leaves via the second end of the heat exchanger core 26. The second fluid 30 then leaves the heat exchanger 10 at the second fluid outlet 16. The first fluid 28 enters the heat exchanger 10 via the first fluid inlet conduit 18 at an angle between 45 and 90 degrees to the longitudinal direction off the duct 12. The first fluid 28 then travels through the first fractal channel 22 and enters the first fluid channels 38 at the second end of the heat exchanger core 26. The first fluid 28 travels along the first fluid channels 38 of the heat exchanger core 26 and then enters the second fractal channel 24. The first fluid 28 then exits via the first fluid outlet conduit 20.

It will be appreciated that the first fluid 28 and the second fluid 30 could instead travel in the same direction so that parallel flow is utilised by the heat exchanger 10.

The first and second fractal channels 22, 24 are positioned within the body 12 and hence the fractal channels 22, 24 are submerged in the flow path of the second fluid 30. This means that heat transfer will take place between the first and second fluids 28, 30 as they pass around and through the fractal channels 22, 24, respectively, as well as when they flow through the heat exchanger core 26.

As counter flow is utilised, the temperature difference will be more uniform along the length of the duct than if parallel flow is utilised. This prevents the hottest fluid from being in contact with the coldest fluid and hence reduces the thermal stresses on the thin channels and walls of the fractal channels 22, 24.

Figure 3:
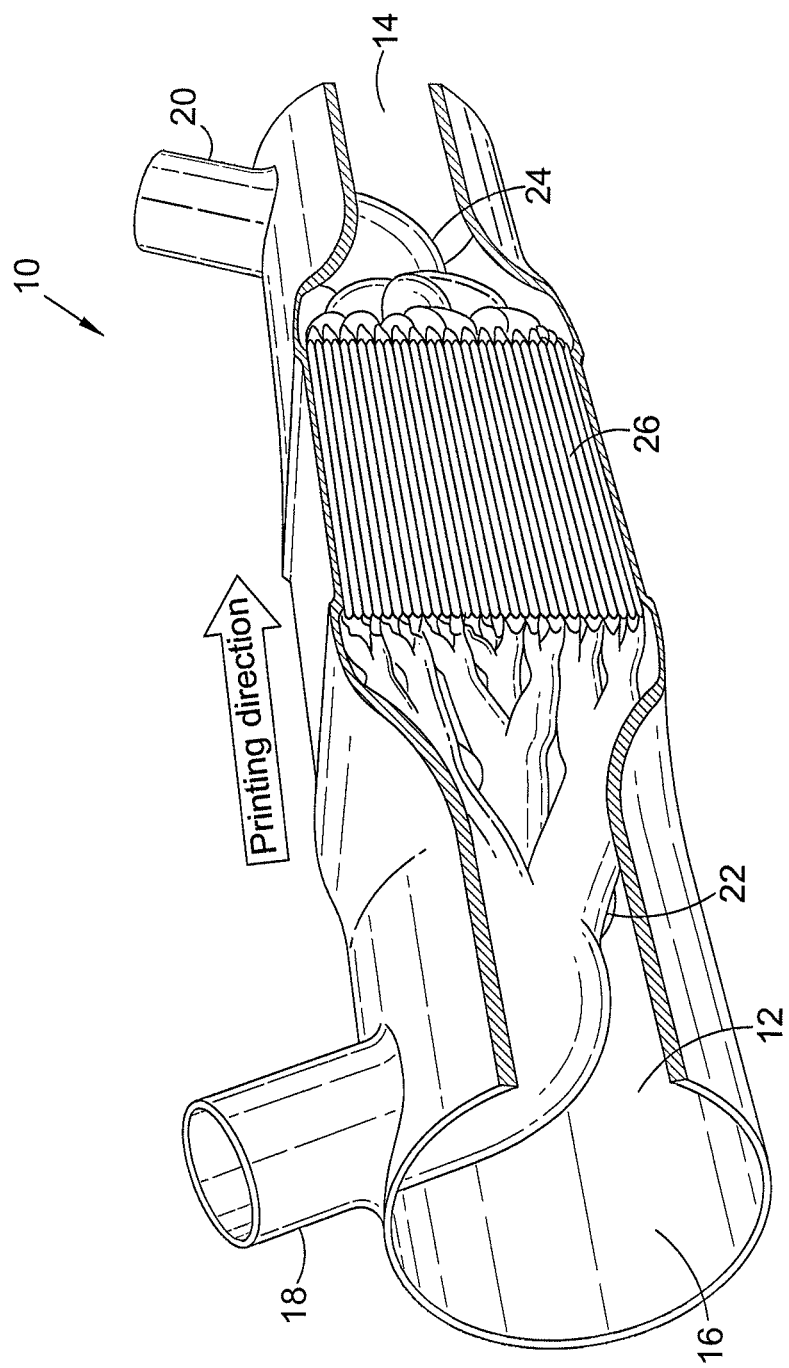
FIG. 3 shows a heat exchanger manufactured by additive manufacturing.

FIG. 3 shows how the heat exchanger 10 can be manufactured by additive manufacturing. The heat exchanger 10 can be manufactured using additive manufacturing as one piece.

By printing the heat exchanger 10 from the first fluid outlet 16 to the first fluid inlet 14, or vice versa first fluid inlet 14 to the first fluid outlet 16, the structure will be self-supporting during the additive manufacturing process.

The illustrated heat exchanger 10 is straight, however it will be appreciated that the heat exchanger 10 can be curved to accommodate existing systems.

The heat exchanger 10 can be printed by additive manufacture from any material suitable for the intended operating conditions. The type of material depends on the specific application of the heat exchanger 10.

Exemplary materials that may be used are aluminium, steel, nickel, alloys or titanium or superalloys such as Inconel 625. Aluminium may be suitable for low to medium temperature applications. Polymers may be suitable for low temperature applications. Polymers may also be used if it is desirable for the heat exchanger to be flexible.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A heat exchanger comprising:
   a heat exchanger core comprising a plurality of channels in a packed configuration, the plurality of channels comprising a plurality of first channels and a plurality of second channels;
   a first fractal channel for conveying a first fluid to the plurality of first channels of the heat exchanger core;
   a second fractal channel for conveying the first fluid from the plurality of first channels of the heat exchanger core;
   an outer wall extending from the heat exchanger core and defining a second fluid inlet and a second fluid outlet for a second fluid to flow through the plurality of second channels, wherein the second fluid inlet and the second fluid outlet are axially aligned with each other along a longitudinal axis of the heat exchanger to allow the outer wall to replace part of a duct carrying a second fluid in use so that the second fluid surrounds the first and second fractal channels allowing the first and second fractal channels to take part in the heat transfer in use; and
   a first fluid inlet conduit connected to the first fractal channel and a first fluid outlet conduit connected to the second fractal channel, the first fluid inlet and outlet conduits both extending through the outer wall;
   wherein the first fractal channel and the second fractal channel each comprises at least one divergence point along its length where a parent channel splits into a plurality of sub-channels which diverge away from each other;
   wherein the heat exchanger core comprises a homogeneous block of material having a plurality of bores extending therethrough defining the plurality of channels.

2. The heat exchanger according to claim 1, wherein the first fractal channel and the second fractal channel each comprises a plurality of fractal stages, wherein each fractal stage comprises at least one parent channel, a divergence point and a plurality of sub-channels, and wherein the plurality of sub-channels of one fractal stage form parent channel of a subsequent fractal stage.

3. The heat exchanger according to claim 2, wherein the sub-channels of each fractal stage are distributed in a grid configuration.

4. The heat exchanger according to claim 2, wherein the sub-channels of each fractal stage are shaped such that at least a portion of each sub-channel is parallel to a common axis.

5. The heat exchanger according to claim 1, wherein the plurality of channels in the heat exchanger core each have a diamond-shaped cross-section.

6. The heat exchanger according to claim 1, wherein the plurality of first channels and the plurality of second channels are arranged in alternating fashion within the heat exchanger core.

7. The heat exchanger according to claim 1, wherein a cross-sectional area of each parent channel is equal to a total cross-sectional area of its corresponding sub-channels.

8. The heat exchanger according to claim 1, wherein the first fluid inlet conduit and the first fluid outlet conduit are at an angle of between 45 and 90 degrees with respect to the longitudinal axis of the body of the heat exchanger.

9. A method comprising:
   manufacturing a heat exchanger according to claim 1 by a process of additive manufacturing as one piece.

* * * * *